United States Patent
Lou et al.

(10) Patent No.: US 12,504,472 B2
(45) Date of Patent: Dec. 23, 2025

(54) TEST CIRCUIT AND TEST APPARATUS COMPRISING THE TEST CIRCUIT

(71) Applicant: Montage Technology Co., Ltd., Shanghai (CN)

(72) Inventors: Dongming Lou, Shanghai (CN); Weidong Fan, Shanghai (CN); Zhongyuan Chang, Shanghai (CN)

(73) Assignee: Montage Technology Co., Ltd., Shanghai (CN)

( * ) Notice: Subject to any disclaimer, the term of this patent is extended or adjusted under 35 U.S.C. 154(b) by 328 days.

(21) Appl. No.: 18/311,870

(22) Filed: May 3, 2023

(65) Prior Publication Data

US 2024/0337694 A1 Oct. 10, 2024

(30) Foreign Application Priority Data

Apr. 4, 2023 (CN) .......................... 202310355906.4

(51) Int. Cl.
*G01R 31/319* (2006.01)
*G01R 27/14* (2006.01)
*G01R 31/28* (2006.01)

(52) U.S. Cl.
CPC ... *G01R 31/31905* (2013.01); *G01R 31/2879* (2013.01); *G01R 31/31924* (2013.01); *G01R 27/14* (2013.01)

(58) Field of Classification Search
CPC .......... G01R 31/31905; G01R 31/2879; G01R 31/31924; G01R 27/14; G01R 31/2836; G01R 1/0416; G01R 31/2801; G01R 31/2806; G01R 31/2812; G01R 31/52; G01R 31/54; G01R 31/2837
USPC ....................................................... 324/754.07
See application file for complete search history.

(56) References Cited

U.S. PATENT DOCUMENTS

| | | | |
|---|---|---|---|
| 2018/0306856 A1* | 10/2018 | Chu | ......................... G01R 1/36 |
| 2024/0036114 A1* | 2/2024 | Aherne | .............. G01R 31/2879 |
| 2024/0053391 A1* | 2/2024 | Lee | ..................... G01R 31/2851 |

* cited by examiner

*Primary Examiner* — Paresh Patel
*Assistant Examiner* — Hugo Navarro
(74) *Attorney, Agent, or Firm* — JCIPRNET

(57) ABSTRACT

A test circuit includes a signal processor, a first resistor, a second resistor, a first switch, and a second switch. The signal processor is coupled to a first drive end, a second drive end, a first sensing end, and a second sensing end. The first resistor is coupled between the first drive end and the first sensing end. The second resistor is coupled between the second drive end and the second sensing end. The first switch is coupled between the first sensing end and a first end of a device under test. The second switch is coupled between the second sensing end and a second end of the device under test. The first drive end is coupled to the first end of the device through a first transmission wire, and the second drive end is coupled to the second end of the device through a second transmission wire.

15 Claims, 4 Drawing Sheets

TEST CIRCUIT AND TEST APPARATUS COMPRISING THE TEST CIRCUIT

CROSS-REFERENCE TO RELATED APPLICATION

This application claims the priority benefit of China application serial no. 202310355906.4, filed on Apr. 4, 2023. The entirety of the above-mentioned patent application is hereby incorporated by reference herein and made a part of this specification.

BACKGROUND

Technical Field

The disclosure relates to a test circuit and a test apparatus including the test circuit, and in particular, relates to a test circuit capable of eliminating the influence of a contact resistor and a test apparatus including the test circuit.

Description of Related Art

In a general chip testing process, the open circuit and short circuit testing of a pin is the most basic test item in the testing process and is also known as the connectivity testing. Generally, the electrostatic protection diode at the input and output ends of a chip is used to determine whether the pin and its corresponding test socket are in good contact. During the connectivity testing, a positive or negative current of approximately 100 μA to 1 mA is applied to the pin of the chip through a current source, and a voltage on the pin is then read. Depending on the characteristics of the diodes inside the chip, the voltage on the pin is typically between 200 mV and 900 mV. However, this method of determining whether the contact is good through the protection diode is not enough in the testing process of a high-power chip. This is because when the single-pin current of the pogo pin of the test socket reaches 1 ampere or greater, if the contact between the chip and the test socket is poor, the increase in contact resistance will cause a sharp increase in the heat of the contact point during the high-current testing. Due to untimely heat dissipation, the pogo pin of the chip or the test socket may be easily burned out. Therefore, in the mass production testing, the contact resistance test must be added when performing the high-current testing of the pin to prevent the pogo pin and the test socket from being burned out. The method of using the characteristics of the protection diode to test the connectivity cannot determine the situation where the contact resistance only increases from tens of milliohms to several ohms.

SUMMARY

The disclosure provides a test circuit and a test apparatus including the test circuit configured to perform a test operation of a high-power chip.

An embodiment of the disclosure provides a test circuit including a signal processor, a first resistor, a second resistor, a first switch, and a second switch. The signal processor is coupled to a first drive end, a second drive end, a first sensing end, and a second sensing end. The first resistor is coupled between the first drive end and the first sensing end. The second resistor is coupled between the second drive end and the second sensing end. The first switch is coupled between the first sensing end and a first end of a device under test. The second switch is coupled between the second sensing end and a second end of the device under test. Herein, the first drive end is coupled to the first end of the device under test through a first transmission wire, and the second drive end is coupled to the second end of the device under test through a second transmission wire.

An embodiment of the disclosure further provides a test apparatus configured to test a chip and including the above-mentioned test circuit.

The above is an overview of the application, and there may be cases where the details are simplified, generalized, and omitted, so those skilled in the art should realize that this part is only illustrative and is not intended to limit the scope of the application in any way. This summary section is neither intended to determine the key features or essential features of the claimed subject matter nor intended to be used as an auxiliary means to determine the scope of the claimed subject matter.

DESCRIPTION OF THE EMBODIMENTS

Figure 1:
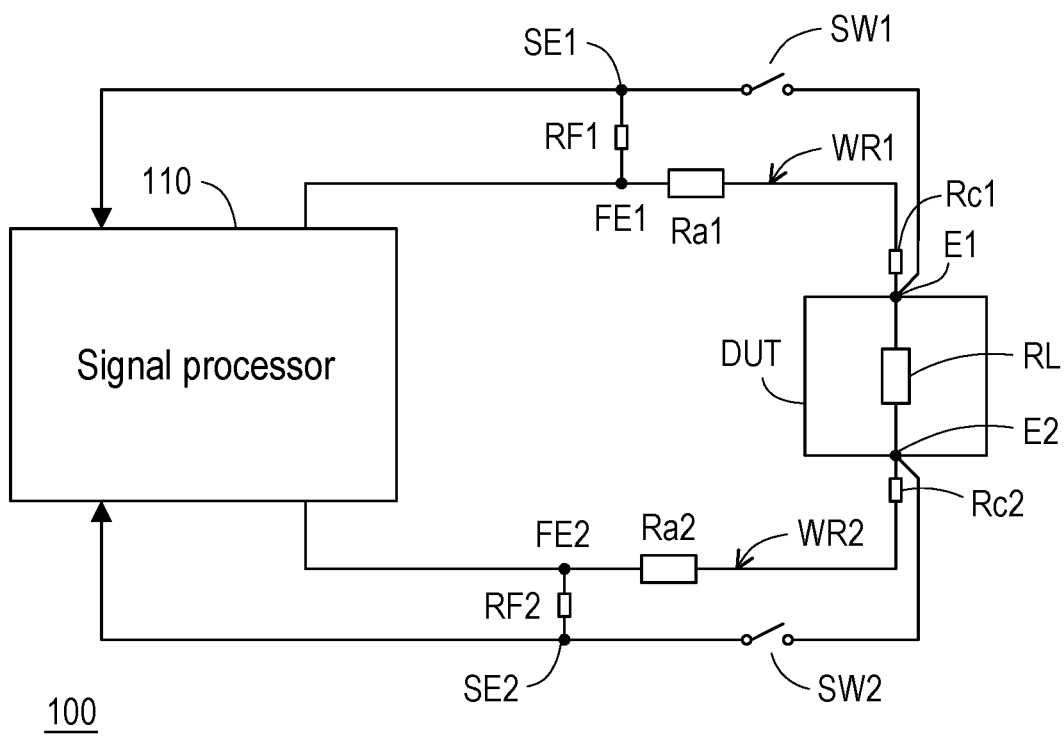
FIG. 1 is a schematic diagram of a test circuit according to an embodiment of the disclosure.

Descriptions of the disclosure are given with reference to the exemplary embodiments illustrated by the accompanying drawings. Wherever possible, the same reference numbers are used in the drawings and the description to refer to the same or like parts.

With reference to FIG. 1, FIG. 1 is a schematic diagram of a test circuit according to an embodiment of the disclosure. A test circuit 100 is coupled to a device under test DUT. The test circuit 100 includes a signal processor 110, a resistor Rf1, a resistor Rf2, a switch SW1, and a switch SW2. The signal processor 110 is coupled to a first drive end FE1, a second drive end FE2, a first sensing end SE1, and a second sensing end SE2. The resistor Rf1 is coupled between the first drive end FE1 and the first sensing end SE1. The second resistor Rf2 is coupled between the second drive end FE2 and the second sensing end SE2. The switch SW1 is coupled between the first sensing end SE1 and a first end E1 of the device under test DUT. The second switch SW2 is coupled between the second sensing end SE2 and a second end E2 of the device under test DUT. Herein, the first drive end FE1 in the test circuit 100 is coupled to the first end E1 of the device under test DUT through a first transmission wire WR1, and the second drive end FE2 in the test circuit 100 is coupled to the second end E2 of the device under test DUT through a second transmission wire WR2. In an embodiment, the first transmission wire WR1 and the second transmission wire WR2 may be traces of a printed circuit board (PCB).

In this embodiment, a resistor on the first transmission wire WR1 is represented as a resistor Ra1, and a resistor on the second transmission wire WR2 is represented as a resistor Ra2. In addition, the first transmission wire WR1 may be connected to the first end E1 of the device under test DUT through a connection interface. Therefore, a contact resistor Rc1 is provided between the first transmission wire WR1 and the first end E1 of the device under test DUT. The second transmission wire WR2 may be connected to the second end E2 of the device under test DUT through the connection interface. Therefore, a contact resistor Rc2 is provided between the second transmission wire WR2 and the second end E2 of the device under test DUT. In this embodiment, the abovementioned connection interface may be a test socket and a pogo pin thereon of a chip.

Further, each of the switches SW1 and SW2 may be implemented by any component that can be used to turn on or off the circuit connection known to a person having ordinary skill in the art without any specific limitation. In this embodiment, the switches SW1 and SW2 may be relays. The test circuit 100 may provide a control signal to control the on and off states of the switches SW1 and SW2. In this embodiment, the test circuit 100 can turn off the switches SW1 and SW2 in a first stage and turn on the switches SW1 and SW2 in a second stage.

It should be noted that in this embodiment, resistance values of the resistors Rf1 and Rf2 may be greater than resistance values of the contact resistors Rc1 and Rc2. Further, in a normal state, the resistance values of the resistor Ra1 on the first transmission wire WR1 and the resistor Ra2 on the second transmission wire WR2 are fixed values and are small values (much smaller than the resistance values of the resistors Rf1 and Rf2). The device under test DUT is, for example, a high-power chip, and may have a small resistor RL.

Figure 2:
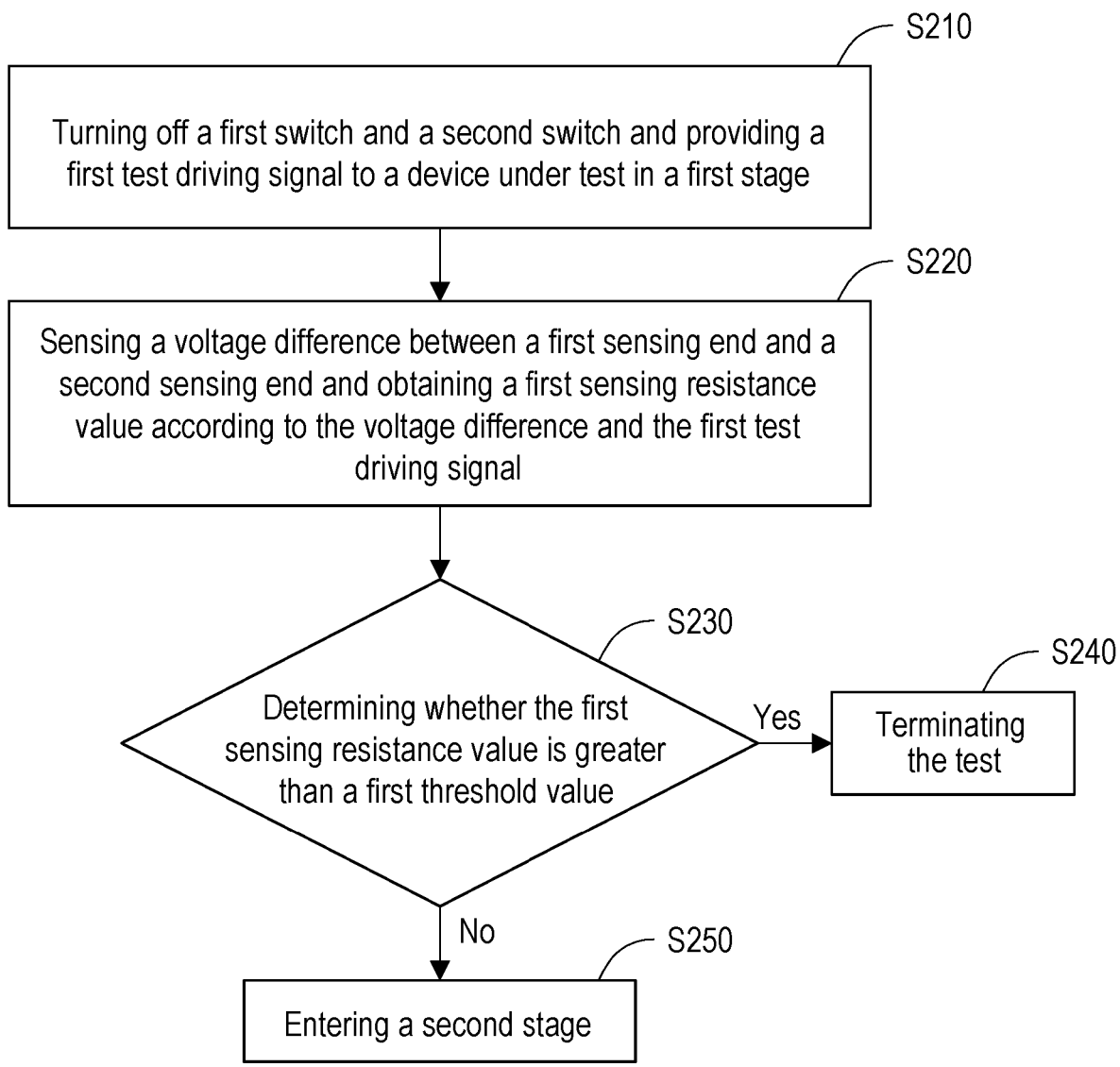
FIG. 2 is a flow chart of a test operation performed by the test circuit according to an embodiment of the disclosure.

For the details of a test operation performed by the test circuit 100, with reference to FIG. 1 and FIG. 2 together, FIG. 2 is a flow chart of a test operation performed by the test circuit according to an embodiment of the disclosure. In step S210, when the test circuit 100 performs a test operation, the test circuit 100 may enter a first step first. In the first step, the test circuit 100 may turn off a first switch (i.e., the switch SW1) and a second switch (i.e., the switch SW2) and may make the signal processor 110 provide a test driving signal to the device under test DUT. In detail, the test circuit 100 can transmit and receive a first test driving signal to and from the device under test DUT through the first drive end FE1 and the second drive end FE2. At this time, since the switch SW1 and the switch SW2 are turned off, the first test driving signal may be transmitted from the first drive end FE1 to the first end E1 of the device under test DUT through the transmission wire WR1 and then be transmitted from the second end E2 of the device under test DUT to the second drive end FE2 through the transmission wire WR2.

Next, in step S220, the signal processor 110 may sense a voltage difference between the first sensing end SE1 and the second sensing end SE2 at this time and calculates a first sensing resistance value according to the first test driving signal and the voltage difference between the first sensing end SE1 and the second sensing end SE2.

In this embodiment, the first test driving signal may be a test current. The test current may pass through the resistor Ra1 on the first transmission wire WR1, the contact resistor Rc1 on the first end E1 of the device under test DUT, the device under test DUT having the resistor RL, the contact resistor Rc2 on the second end E2 of the device under test DUT, and the resistor Ra2 on the second transmission wire WR2. Therefore, in step S220, by dividing the voltage difference between the first sensing end SE1 and the second sensing end SE2 by a current value of the first test driving signal, it can be calculated that the first sensing resistance value is equal to a sum of resistance values of the resistors Ra1, Ra2, and RL and the contact resistors Rc1 and Rc2.

In step S230, the test circuit 100 may determine whether the first sensing resistance value is greater than a predetermined first threshold value through the signal processor 110. Herein, when the first sensing resistance value is not greater than the first threshold, step S250 may be performed to enter the second stage. In contrast, when the first sensing resistance value is greater than the first threshold, step S240 may be performed, and the execution of the test operation may be terminated.

It should be noted that the first sensing resistance value should be equal to the sum of resistance values of the resistors Ra1, Ra2, and RL and the contact resistors Rc1 and Rc2. The resistors Ra1 and Ra2 on the transmission wires WR1 and WR2, the resistor RL of the device under test DUT, and the contact resistors Rc1 and Rc2 shall all have fixed and small values. Therefore, when the sensed first sensing resistor is greater than the first threshold value, it indicates that the device under test DUT may be in an abnormal state, or the connection state between the transmission wires WR1 and WR2 and the device under test DUT is abnormal. Therefore, the test circuit 100 may terminate the test operation to ensure the safety of the test circuit 100 and the device under test DUT.

Incidentally, in the first stage, the first test driving signal provided by the signal processor 110 is, for example, a test current not greater than 200 mA.

In addition, the resistance values of the resistors Rf1 and Rf2 may be in a range of 1 kohm and 10 kohm, and the accuracy of the test may be improved in this way.

Figure 3:
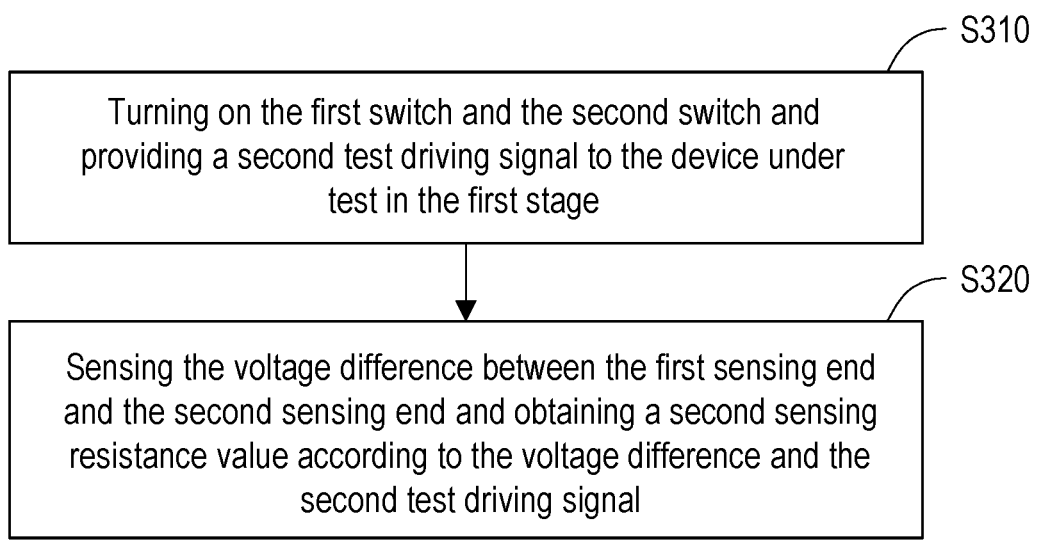
FIG. 3 is a flow chart of the test operation performed by the test circuit in another stage according to an embodiment of the disclosure.
Figure 4:
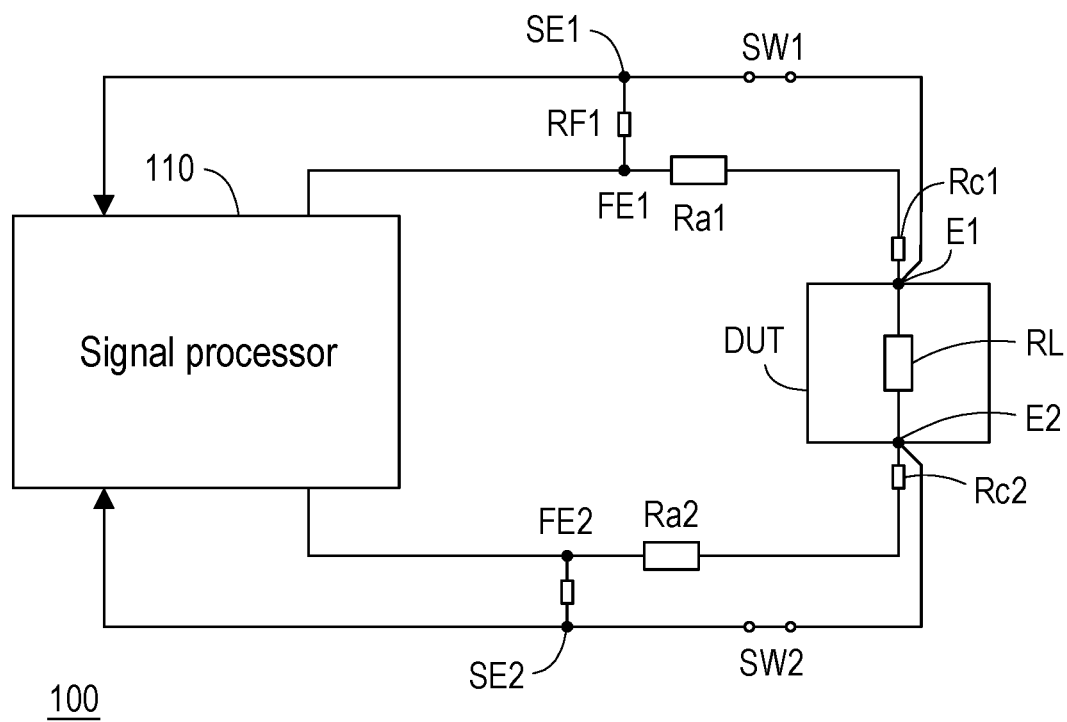
FIG. 4 is a schematic circuit diagram of the test circuit in a second stage according to an embodiment of the disclosure.

With reference to FIG. 3 and FIG. 4 together, FIG. 3 is a flow chart of the test operation performed by the test circuit in another stage according to an embodiment of the disclosure, and FIG. 4 is a schematic circuit diagram of the test circuit in the second stage according to an embodiment of the disclosure. The test circuit 100 in FIG. 4 has the same circuit architecture as the test circuit 100 in FIG. 1. In step S310, in the second stage, the test circuit 100 makes the switch SW1 and the switch SW2 in a turning-on state (i.e., in a closed state). At the same time, the signal processor 110 provides a second test driving signal to the device under test DUT through the first drive end FE1.

Next, in step S320, the signal processor 110 may sense the voltage difference between the first sensing end SE1 and the second sensing end SE2 and calculates a second sensing resistance value according to the second test driving signal and the voltage difference between the first sensing end SE1 and the second sensing end SE2. Since the switch SW1 is turned on, the switch SW1 may bypass the resistor Ra1 on the first transmission wire WR1 and the contact resistor Rc1 between the first transmission wire WR1 and the first end E1 of the device under test DUT. Likewise, since the switch SW2 is turned on, the switch SW2 may bypass the resistor Ra2 on the second transmission wire WR2 and the contact resistor Rc2 between the second transmission wire WR2 and the second end E2 of the device under test DUT. Therefore, the voltage difference between the first sensing end SE1 and the second sensing end SE2 sensed by the signal processor 110 may be substantially equal to a voltage difference between the first end E1 and the second end E2 of the device under test DUT.

Further, the signal processor 110 of the test circuit 100 may calculate the second sensing resistance value by dividing the voltage difference between the first sensing end SE1 and the second sensing end SE2 by a current value of the second test driving signal. Since the contact resistors Rc1 and Rc2 are always much smaller than the resistors Rf1 and Rf2, the calculated second sensing resistance value is substantially equal to the resistance value of the resistor RL of the device under test DUT.

It is worth mentioning that in the second stage, after the switch SW1 and the switch SW2 are turned on, the signal processor 110 may output the second test driving signal as a fixed current. The current value of the second test driving signal may be determined according to the bearing capacity of the connection interface (e.g., a pogo pin) between the device under test DUT and the first transmission wire WR1 and the second transmission wire WR2. Compared to the aforementioned first stage, the current value of the second test driving signal output by the signal processor 110 at this time may be much larger than the current value of the first test driving signal. Herein, the current value of the second test driving signal may be, for example, 1 ampere, or greater than 1 ampere.

Incidentally, in the embodiments of the disclosure, the signal processor 110 may include a digital power supply (DPS).

It can be seen from the above description that the test circuit 100 of the disclosure can accurately measure the small resistor RL in the device under test DUT under the requirement of low costs through a low-cost digital power supply, for example, together with the resistors Rf1 and Rf2 as well as the switches SW1 and SW2. Further, the test circuit 100 of the disclosure may first determine whether to enter the second stage by sensing whether the contact resistors Rc1 and Rc2 and the resistor RL in the device under test DUT are abnormal in the first stage, so that the safety of the components is effectively ensured.

An embodiment of the disclosure provides a test apparatus configured to test a chip and including the above-mentioned test circuit.

In an embodiment of the disclosure, the test circuit and the test apparatus execute different stages of test operations by controlling the on or off states of the first switch and the second switch. Further, the test circuit provided by an embodiment of the disclosure first tests whether the device under test (chip) is normal. When the chip is in a normal state, the test circuit can test a resistance value of the chip and complete the test operation of a milliohm-level small resistor inside the chip.

The test circuit of the disclosure may be widely used in testing high-current chips to reduce test costs, for example, may be applied to a power management integrated circuit (PMIC). In traditional mass production testing of PMIC chips, a special analog testing machine is used for testing most of the time because the analog testing machine has a dedicated Kelvin connectivity sensing circuit, so that the chip under test is ensured to be well connected during the test, and the chip under test and the test socket are protected from being burned by a high current. However, the testing costs of the analog testing machine are high. The disclosure makes it possible to use a low-end digital testing machine requiring low testing costs to test the PMIC chips. By using the test circuit provided by the disclosure, when testing of a PMIC chip begins, it is easy to sense whether the connection between the PMIC chip and the test socket is good. In this way, the chip under test and the test socket are protected from being burned by high-current testing.

Finally, it is worth noting that the foregoing embodiments are merely described to illustrate the technical means of the disclosure and should not be construed as limitations of the disclosure. Even though the foregoing embodiments are referenced to provide detailed description of the disclosure, people having ordinary skill in the art should understand that various modifications and variations can be made to the technical means in the disclosed embodiments, or equivalent replacements may be made for part or all of the technical features; nevertheless, it is intended that the modifications, variations, and replacements shall not make the nature of the technical means to depart from the scope of the technical means of the embodiments of the disclosure.

What is claimed is:

1. A test circuit, comprising:
   a signal processor coupled to a first drive end, a second drive end, a first sensing end, and a second sensing end;
   a first resistor coupled between the first drive end and the first sensing end;
   a second resistor coupled between the second drive end and the second sensing end;
   a first switch coupled between the first sensing end and a first end of a device under test; and
   a second switch coupled between the second sensing end and a second end of the device under test,
   wherein the first drive end is coupled to the first end of the device under test through a first transmission wire, and the second drive end is coupled to the second end of the device under test through a second transmission wire,
   wherein the signal processor transmits and receives a first test driving signal to and from the device under test through the first drive end and the second drive end in a first stage, and in the first stage, when the first test driving signal transmitting to and from the device under test through the first drive end and the second drive end, the first switch and the second switch are turned off,
   wherein in a second stage, the first switch is configured to bypass a resistor on the first transmission wire and a first contact resistor between the first transmission wire and the device under test, and the second switch is configured to bypass a resistor on the second transmission wire and a second contact resistor between the second transmission wire and the device under test.

2. The test circuit according to claim 1, wherein the signal processor senses a voltage difference between the first sensing end and the second sensing end in the first stage and obtains a first sensing resistance value according to the voltage difference and the first test driving signal.

3. The test circuit according to claim 2, wherein the first test driving signal is a test current.

4. The test circuit according to claim 2, wherein the first sensing resistance value is equal to a sum of resistance values of a resistor of the device under test, a first contact resistor between the first transmission wire and the device under test, a second contact resistor between the second transmission wire and the device under test, a resistor of the first transmission wire, and a resistor of the second transmission wire.

5. The test circuit according to claim 2, wherein the signal processor determines whether the first sensing resistance value is greater than a first threshold value and enters the second stage when the first sensing resistance value is less than or equal to the first threshold value.

6. The test circuit according to claim 5, wherein in the second stage, the first switch and the second switch are turned on, and the signal processor transmits and receives a second test driving signal to and from the device under test through the first drive end and the second drive end.

7. The test circuit according to claim 6, wherein in the second stage, the signal processor senses the voltage difference between the first sensing end and the second sensing end and obtains a second sensing resistance value according to the voltage difference and the second test driving signal.

8. The test circuit according to claim 7, wherein the second test driving signal is a test current.

9. The test circuit according to claim 7, wherein the second sensing resistance value is equal to a resistance value of the device under test.

10. A test apparatus configured to test a chip, comprising:
a test circuit, comprising:
   a signal processor coupled to a first drive end, a second drive end, a first sensing end, and a second sensing end;
   a first resistor coupled between the first drive end and the first sensing end;
   a second resistor coupled between the second drive end and the second sensing end;
   a first switch coupled between the first sensing end and a first end of a device under test; and
   a second switch coupled between the second sensing end and a second end of the device under test,
wherein the first drive end is coupled to the first end of the device under test through a first transmission wire, and the second drive end is coupled to the second end of the device under test through a second transmission wire,
wherein the signal processor transmits and receives a first test driving signal to and from the device under test through the first drive end and the second drive end in a first stage, and in the first stage, the first switch and the second switch are turned off, when the first test driving signal transmitting to and from the device under test through the first drive end and the second drive end, the first switch and the second switch are turned off,
wherein in a second stage, the first switch is configured to bypass a resistor on the first transmission wire and a first contact resistor between the first transmission wire and the device under test, and the second switch is configured to bypass a resistor on the second transmission wire and a second contact resistor between the second transmission wire and the device under test.

11. The test apparatus according to claim 10, wherein the signal processor senses a voltage difference between the first sensing end and the second sensing end in the first stage and obtains a first sensing resistance value according to the voltage difference and the first test driving signal.

12. The test apparatus according to claim 10, wherein the first sensing resistance value is equal to a sum of resistance values of a resistor of the device under test, a first contact resistor between the first transmission wire and the device under test, a second contact resistor between the second transmission wire and the device under test, a resistor of the first transmission wire, and a resistor of the second transmission wire.

13. The test apparatus according to claim 10, wherein the signal processor determines whether the first sensing resistance value is greater than a first threshold value and enters the second stage when the first sensing resistance value is less than or equal to the first threshold value.

14. The test apparatus according to claim 13, wherein in the second stage, the first switch and the second switch are turned on, and the signal processor transmits and receives a second test driving signal to and from the device under test through the first drive end and the second drive end, and the signal processor senses the voltage difference between the first sensing end and the second sensing end and obtains a second sensing resistance value according to the voltage difference and the second test driving signal.

15. The test apparatus according to claim 10, wherein the second sensing resistance value is equal to a resistance value of the device under test.

\* \* \* \* \*